United States Patent [19]

Mason et al.

[11] E Re. 30,165

[45] Reissued Dec. 11, 1979

[54] ELECTRIC DISCHARGE LAMP

[75] Inventors: David R. Mason; Susan M. Cole, both of Runcorn; Maurice A. Cayless; David O. Wharmby, both of London, all of England

[73] Assignee: Thorn Lighting Limited, London, England

[21] Appl. No.: 826,237

[22] Filed: Aug. 19, 1977 (Under 37 CFR 1.47)

Related U.S. Patent Documents

Reissue of:

[64] Patent No.: 3,900,754
Issued: Aug. 19, 1975
Appl. No.: 434,382
Filed: Jan. 18, 1974

[30] Foreign Application Priority Data

Jun. 19, 1973 [GB] United Kingdom ..... 2953/73

[51] Int. Cl.[2] ..... H01J 61/30

[52] U.S. Cl. ..... 313/221; 313/218

[58] Field of Search ..... 313/221, 218; 117/211, 117/201

[56] References Cited

U.S. PATENT DOCUMENTS

| | | | |
|---|---|---|---|
| 2,030,397 | 2/1936 | Reynolds | 313/221 |
| 2,393,469 | 1/1946 | Hooley | 313/221 X |

*Primary Examiner*—Robert Segal
*Assistant Examiner*—Darwin R. Hostetter
*Attorney, Agent, or Firm*—Dike, Bronstein, Roberts, Cushman & Pfund

[57] ABSTRACT

Electric discharge lamps of extended life can be produced or cheaper materials used in their manufacture by providing on the internal surface of the envelope and on the exposed surfaces of internal components a protective coating of a metal phosphate or arsenate glass. External surfaces can also be protected against corrosion in air or in the atmosphere within an outer jacket, where this is employed. The coating may be applied in a liquid medium which, preferably after draining, is warmed to evaporate the medium and thereafter baked to form the vitreous coating.

9 Claims, 4 Drawing Figures

ELECTRIC DISCHARGE LAMP

Figure 1:
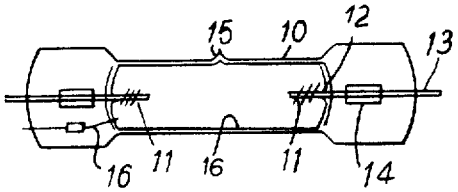

Matter enclosed in heavy brackets [ ] appears in the original patent but forms no part of this reissue specification; matter printed in italics indicates the additions made by reissue.

The present invention relates to electric discharge devices and more especially to discharge lamps the envelopes of which contain a fill of a reactive gas or vapour. The invention is concerned with the provision of protective coatings on internal surfaces of such lamps.

Various types of discharge lamp have gas fills containing gases or vapours which are reactive or potentially reactive with materials commonly used for lamp envelopes and the internal components of the lamps. Among these types may be particularly mentioned metal halide discharge lamps, and metal vapour discharge lamps containing the vapours of reactive metals, such as sodium.

In metal halide discharge lamps the radiation is produced by an electric arc between two primary electrodes extending into an envelope, or arc tube, containing mercury and one or more metallic halides which are at least partially vaporised and dissociated by the heat of the arc during operation of the lamp. The envelope is commonly constructed of vitreous fused silica, although sometimes another transparent or translucent glass, ceramic or crystalline material is used.

One problem which limits the performance of such lamps is reaction between the material of the envelope, or of the electrodes and supports, and the metallic halide contents. Such reactions can cause any of the following: darkening or obscuration of the envelope wall, with consequent loss of light; erosion of the electrodes and supports; loss of the constituent vapours in the discharge causing changes of colour or electrical characteristics; or mechanical failure of the envelope and destruction of the lamp.

Other discharge lamps have arc tubes formed of a translucent ceramic material or translucent crystalline material and frequently contain highly reactive metallic elements, such as sodium or other alkali metal. These elements cannot be used in arc tubes constructed of vitreous silica or most glasses, because of the tendency of the metal vapour to react with these materials.

In accordance with this invention, attack by reactive fill substance on portions of the structure of a discharge lamp or device is reduced or prevented by providing, on at least those portions of the internal surface of the discharge envelope or the exposed surfaces of internal components which tend to react with the fill, a coating of a metal phosphate or arsenate glass. The surfaces to be covered will usually include the internal surfaces of the envelope and the electrode supports.

In accordance with a further aspect of this invention, in discharge lamps where the arc tube is enclosed in an outer envelope which itself contains a gas or gases, external surfaces of the arc tube or components thereof may also be protected by a coating of metal phosphate or arsenate glass and thereby preserved from attack by gases or vapours in the outer envelope.

The protective coatings provided in accordance with this invention may be applied to conventional materials used for the fabrication of lamp components, for example to protect them from highly reactive fill substances, or they may enable cheaper and more readily available materials to be substituted for conventionally used materials without unacceptable loss in performance or life.

The coating is preferably derived from an aluminium phosphate complex as described in German Offenlegungschrift (DOS) No. 2,028,839 (British Patents Nos. 1,322,722 and 1,322,724), one or more of the metal phosphate or arsenate compositions prepared in accordance with DOS No. 2,235,651 or from a composition comprising an aluminium phosphate and containing a titanium compound prepared in accordance with DOS No. 2,331,954. Combinations of these compositions can also be used.

For the purposes of this invention, preferred metal phosphates and arsenates are those of atomic number 12 to 14, 20 to 32, 39 to 50, 56 to 80, 90 or 92. The term 'phosphate' is here meant to include ortho-, meta- and pyro- phosphates together with phosphinates and phosphonates.

Especially preferred sources of metal phosphate coatings are solvent-soluble complex phosphates containing coordinated solvent groups, such as water or polar organic solvents, as described in DOS Nos. 2,028,839 and 2,235,651. Not only are the isolated complex phosphates themselves suitable, but the compositions which are therein described containing phosphate precursors may also be used.

Liquid coating compositions may be used which comprise a solution, of (a) a metal compound and (b) an oxyacid of phosphorus or arsenic, or a compound capable of forming such an oxyacid in the solution. At least part of the solvent may be organic. These compositions are capable of decomposing to a metal phosphate or arsenate on being heated.

The solvent is selected from water or the wide range of organic solvents which dissolve the components of the composition. The organic solvent, when used, is preferably selected from alcohols, esters, ketones, aldehydes, nitrocompounds and ethers, especially monohydric alcohols of the structure ROH, esters of the structure $R^1COOR^2$, ethers of the structure $R^1OR^2$, ketones of the structure $R^1COR^2$, nitrocompounds of the structure $R^1NO_2$ and ethers of the structure $OR^3$, where R, $R^1$ and $R^2$ are alkyl groups or substituted alkyl groups containing from 1 to 10 carbon atoms each, and $R^3$ is a divalent alkyl group having from 4 to 7 carbon atoms one of which may be replaced by an oxygen atom. Mixtures of one or more solvents may be used. Diluents may also be present, provided they do not bring about precipitation of the components of the composition.

Aliphatic alcohols containing 1 to 10 carbon atoms are particularly convenient, especially lower molecular weight alcohols containing 1 to 4 carbon atoms, for example methanol, ethanol, n- or iso-propanol and substituted alcohols especially methoxy- or ethoxy-ethanol. Suitable esters are ethyl acetate or carbonate. Acetyl acetone may be used. Tetrahydrofuran is the most preferred ether to use, though dioxan may also be used. Aromatic hydroxy compounds can be used, but solubility is low in such materials.

The composition may be formed by dissolving an isolated complex of the type described in the specifications referred to above in a solvent. The metal compound may itself be a phosphate and so provide the oxyacid of phosphorus or arsenic, in which case an additional acid may be required to form a homogeneous solution, e.g. hydrochloric or nitric acid.

A wide range of metal compounds may be used. Simple inorganic compounds including oxides and hydroxides are suitable, as are salts such as halides, carbonates, nitrates, phosphates, perchlorates and cyanates. Sulphates may be used in some cases but they can be disadvantageous owing to the difficulty with which they are thermally decomposed.

Also suitable are salts of organic acids such as acetates, benzoates, oxalates, propionates or formates. Alkoxides are also useful.

Alternatively co-ordination complexes of the metal may be used, for example complexes having ligands derived from acetylacetone, ethylenedithiol, ethanolamine, carbon monoxide or phosphines.

Preferred compositions are those in which the metal and oxyacid are present with atomic ratios of metal to phosphorus or arsenic from 1:0.1 to 1:2.9. Preferred metals are aluminium, iron, chromium, titanium, vanadium and tin.

A solvent-soluble aluminium phosphate may be used, for example the acid orthophosphates $Al_2(HPO_4)_3$ and $Al(H_2PO_4)_3$, and mixtures containing them.

Normal aluminium orthophosphate is insoluble in water but soluble in dilute mineral acids (for example hydrochloric and nitric acids) and in some carboxylic acids (for example citric acid) and such solutions may be used for the purpose of this invention. Moreover, solid complex aluminium phosphates containing the anion of the acid and chemically-bound water or alcohol (or a mixture thereof) may also be used.

Where the complex contains an alcohol group, it is preferred that it be an aliphatic alcohol containing from one to four carbon atoms, for example methyl alcohol, ethyl alcohol, n-propyl alcohol or isopropyl alcohol, although complexes with higher alcohols are known and may be used if desired.

The complex phosphates most commonly contain from three to five molecules of the hydroxy compound per phosphorus atom, for example water-containing complexes may have an empirical formula corresponding to $AlPO_4.HCl.(H_2O)_x$ where x is in the range 3 to 5.

The complex aluminium phosphates containing alcohol and their solutions may be prepared by reacting aluminium compound, preferably halide, with an alcohol and phosphoric acid. One such compound has the empirical formula $Al\ P\ Cl\ H_{25}C_8O_8$.

The complex phosphate containing water can be made as above or by hydrolysing the alcohol-containing complex phosphates or, for example, by contacting aluminium phosphate hydrate with gaseous hydrogen chloride.

Iron, chromium, vanadium, titanium and tin phosphate-containing coatings may be prepared by dissolving a salt, preferably a halide, in an alcohol and adding phosphoric acid or a source thereof.

The glass layer should be free from pin-holes or other defect or imperfection which might cause it to break down during operation of the lamp. In one preferred method of making lamps according to this invention, the desired portions of the internal surface of the envelope and the surfaces of internal components which are exposed in the finished lamp are coated either separately or after assembly with a liquid composition capable of generating the desired metal phosphate or arsenate, and subsequently heated to evaporate the solvent and cure the composition to form a defect-free metal phosphate or arsenate coating. It has been found valuable in the production of defect-free coatings to allow the applied liquid coating composition to drain thoroughly and thereafter to bake initially at a relatively low temperature to remove the solvent and subsequently at a controlled higher temperature to complete the formation of the protective coating. The preferred baking temperatures vary with the particular composition of coating material employed, but can be determined by experiment.

Figure 2:
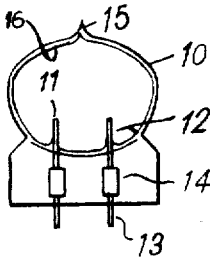
Figure 3:
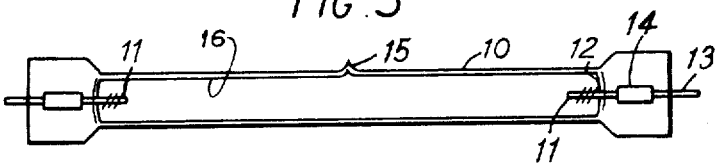
Figure 4:
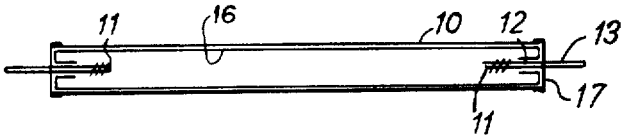

Various aspects of this invention will be described with reference to the accompanying drawings in which:

FIGS. 1, 2 and 3 are respective diagrammatic views of three forms of discharge device to which the invention may be applied; and FIG. 4 is a diagrammatic view of a fourth form of discharge device to which the invention may also be applied.

In accordance with one aspect of this invention, surfaces of electric discharge lamps and devices or components thereof tending to react with the lamp contents are provided with coatings of the phosphate or arsenate glasses described above.

In FIGS. 1 to 3 are shown three examples of discharge devices or lamps. In each case the arc tube or envelope 10 is constructed of vitreous fused silica, into which are sealed electrodes 11 on tungsten shanks 12, electrically connected to external leads or connectors 13 through molybdenum foil pinch seals 14. An exhaust tube 15 is provided in the wall of the tube 10 and is sealed off in the finished lamp, as shown in the drawing.

The form of lamp shown in FIG. 1 commonly contains a mixture of the iodides of scandium, sodium, thorium and mercury, in addition to metallic mercury and a quantity of argon gas. An additional auxiliary electrode 16 may be sealed through one end of the tube 10 for starting purposes. An arc tube of this kind is normally sealed in an outer glass jacket (not shown) which is either evacuated or filled with an inactive gas, and which may be coated with a phosphor. Lamps of this type are commonly designated MBI or MBIF lamps. Other lamps of this construction contain the halides of aluminium or tin, and are commonly referred to as molecular arc lamps.

The form of lamp shown in FIG. 2 may contain the halides of sodium, gallium, thallium and mercury, together with metallic mercury and a rare gas such as xenon. These lamps are very compact and operate at a higher pressure than those of FIG. 1. They are not normally operated in an outer envelope (although they may sometimes be) and are commonly designated Compact Source lamps, or CSI lamps.

The form of lamp shown in FIG. 3 has a longer and narrower arc tube than those of FIG. 1, and is designed to operate without an hermetically sealed outer jacket, but usually in a special closed fitting. These lamps may contain similar halide mixtures to those used in the type of lamp shown in FIG. 1, but other versions intended for photochemical and other special purposes contain other halides, such as the iodides of gallium, indium or bismuth. Lamps of this type are commonly designated MBIL lamps.

In FIG. 4 is shown a further type of arc tube 10 which is made of a translucent ceramic material, such as alumina, or a transparent crystalline material, such as crystalline alumina or sapphire, and in which electrodes 11 are sealed, either through metallic caps 17 or ceramic plugs sealed to the ends. The metallic caps are often of niobium or a niobium alloy, which is particularly reactive with metallic halide compounds. Lamps of this type frequently contain highly reactive metallic elements, such as sodium or the other alkali metals, which cannot be used in arc tubes constructed of vitreous silica or most glasses. The arc tubes of these lamps are commonly fitted within outer jackets.

Many possible chemical reactions may limit the performance of such lamps. Most of these are not fully understood, but certain likely reactions are believed to be responsible for the observed effects.

As an example, when a lamp of the type shown in FIG. 1 containing aluminium trichloride was operated the tungsten electrode supports were rapidly eroded, the surrounding areas of the silica envelope were darkened and a more general attack and devitrification of the envelope was apparent. Although these effects have not yet been positively identified as caused by specific chemical reactions, the following types of reaction are known to be possible:

$$\left.\begin{array}{l} AlCl_3 \longrightarrow AlCl + 2\,Cl \\ xW + 7Cl \longrightarrow W_xCl_y \end{array}\right\} \quad \text{I}$$

$$4AlCl_3 + SiO_2 \longrightarrow 3SiCl_4 + 2AlCl_2O_3 \quad \text{II}$$

$$2\,WCl_6 + SiO_2 \longrightarrow 2\,WOCl_4 + SiCl_4 \quad \text{III}$$

where x and y correspond to several chlorides of tungsten. (The first part of reaction I probably occurs in the higher temperature parts of the discharge, while the second part occurs at the cooler metal surface as a result of incomplete recombination of the chlorine with the monochloride). These could readily account for the main features of the observed behaviour.

Such interactions with the lamp components are not limited to normal chemical reactions with the halides in their solid, liquid or gaseous forms. The presence of the discharge and the associated electric fields permits a much wider range of interaction, erosion or attack, involving the products of dissociation of the compounds, and excited or ionized species derived from them. Electrolytic processes may produce further reactions, and may increase the rate at which some of the interactions occur.

As an example, the presence of an electric field with a definite mean polarity across the tube wall, associated with the current leads to the discharge, is known to greatly enhance the migration of sodium, derived from the dissociation of sodium iodide in such lamps, through the silica walls. This gives rise to a loss of sodium from the arc, with consequent deleterious changes in colour and electrical characteristics. Near the electrodes, electrolytic action of this kind is a frequent cause of mechanical failure of the lamp.

Also, impurity gases or vapours commonly present in lamp envelopes such as water vapour or oxygen may give rise to still further reactions, and enhance the rate of others. Traces of such impurities are commonly left in the gaseous filling during processing, or are introduced with the halides, or may be released from the various components by the action of the discharge.

As an example, oxygen-containing impurities in lamps containing aluminium trichloride can in some circumstances produce chlorine by the reaction:

$$2AlCl_3 + 3O \rightarrow Al_2O_3 + 3Cl_2 \quad \text{IV}$$

leading to a greatly increased rate of erosion of the electrodes by reactions of the type I.

The present invention can be utilized to prevent, control or reduce the incidence of, deleterious interactions of these kinds between the metallic or halide contents and the components of the lamp in contact with them, by coating the surfaces in contact with the metals or halides with a protective layer of metal phosphate or arsenate glass composition which is resistant to interactions of these kinds.

The surfaces to be protected usually include the internal surface of the envelope and the exposed surfaces of the electrode leads or supports, and metal end caps when present, together with, when possible, the regions where different components join. The active surface of the electrodes will not normally be covered.

In some cases there are advantages also in coating the external surfaces of the arc tube, leads or adjoining components, as a protection against the surrounding atmosphere. For example, the metallic caps 17 of lamps of the type shown in FIG. 4 are susceptible to reaction with impurity gases or vapours such as water vapour or oxygen in the surrounding outer jacket. Similarly the leads adjacent to the arc tube in lamps of the type shown in FIG. 3 are liable to reaction with the surrounding air in the fitting. Both these may be protected by external coatings of this type.

The protective layer should be effectively free from pinholes or other defects or imperfections which will cause it to break down during operation of the lamp, although a substantial degree of protection, and consequent improvement in lamp quality may be obtained in some cases when such perfection is not fully achieved.

In a preferred method of providing the coating, it is applied to the whole of the interior of the arc tube after the components have been substantially assembled. This has the advantage that the regions where the components join, which are often particularly susceptible to attack, are fully coated. The active areas of the electrodes may also be coated in this process, but the coating on these will normally be removed when the arc is first struck, or the lamps first operated.

The protective coating may alternatively be applied by coating the components individually before assembly. This method might be used, for example, where it is essential that the active surface of the electrode is not brought into contact with the coating material or any products of reaction associated with it, or it might be used when required by a particular manufacturing technique.

The coating can be applied by filling, injecting or spraying the inside of the arc tube with the complex or a solution of the complex and subsequently removing or draining any surplus, or it can be applied to the individual components by any of the methods described in DOS No. 2,235,651. The complex is then decomposed by heating to yield a phosphate (or arsenate) layer by heating at a temperature below 1000° C. as described in the same specification. The construction and processing of the lamp is then completed in the normal way. The following is one example of the application of the invention.

EXAMPLE

A 400 W aluminium chloride discharge lamp with an arc tube of the form shown in FIG. 1 is protected by coating the inside of the arc tube 10 in the following manner. A solution is prepared by adding slowly and with stirring, 4.646 g anhydrous aluminium chloride to 91.458 g methanol. 3.866 G orthophosphoric acid (88%) is then added. The resultant solution is dispensed from a hypodermic syringe, through the lamp exhaust tube 15, before this is sealed off. It is distributed around the inside of the arc tube, which is then inverted and left to drain, leaving only a thin layer adhering to the inside surfaces. The resultant coating is baked at 100° C. in a vacuum for one hour and finally formed by baking at 400° C. for three minutes.

The lamp is then processed in the normal manner for discharge lamps of this type to give an arc tube of volume 2.2 $cm^3$ which contains 7.4 mg $AlCl_3$ and 44 mg Hg together with a pressure of 20 Torr of argon at room temperature. During processing the arc is struck and the glass layer on the active surface of the electrode is removed, leaving the protective layer over the internal surfaces of the arc tube and the cooler parts of the electrode structures.

The layer substantially increases the resistance of the cooler parts of the electrode leads from erosion by the chloride vapour, preventing blackening of the envelope surface by deposited tungsten and other reaction products. The silica is also protected from reaction with the aluminium chloride.

Instead of the particular aluminium phosphate composition described in the above preferred example, aluminium phosphate or arsenate coatings may be used, prepared from solutions of halogen-containing complex phosphates or arsenates of aluminium as disclosed in DOS No. 2,331,954, coating the internal lamp surfaces, and heating to cure the coating under the conditions substantially as disclosed in the same Application.

Instead of one of the above compositions, coatings may be used prepared from liquid compositions of other metal compounds and oxyacids of phosphorus or arsenic as disclosed in DOS No. 2,235,651, coating the internal lamp surfaces and heating under the conditions substantially as disclosed in the same Application, the remainder of the processing following the same general lines as in the above preferred example.

It should be noted that it is not an essential part of the process of this invention to coat the envelope and internal components after assembly, as described in the above preferred example, and individual components may be coated before lamp assembly. The essential feature of the invention is the provision of a continuous layer consisting essentially of a metal phosphate or arsenate glass covering the interior surface of the envelope or any internal components that could react with the fill or contents of the lamp at the operating temperatures.

Similarly, any external surfaces to be protected may be coated either before or after assembly.

What we claim is:

1. An electrical discharge lamp comprising: an arc tube; components including a pair of spaced electrodes in said arc tube and respective conductive leads or supports for said electrodes; a gaseous fill in said tube; and a transparent, defect-free, solution-deposited protective coating of a vitreous compound selected from metal phosphates and arsenates *which is inert to the gaseous fill in the tube* on at least the [internal surface] *surfaces internally* of the arc tube [and th exposed surfaces of said leads or supports] which [tend to react with] *are reactive to* said *gaseous* fill [during operation of the lamp].

2. A lamp according to claim 1 further comprising metallic end caps on said tube, the internal surface of said end caps being also provided with said coating.

3. A lamp according to claim 1 further comprising a coating of a metal phosphate or arsenate glass on the external surfaces of said arc tube and components of said lamp.

4. A lamp according to claim 3 further comprising a light-transmitting outer jacket enclosing said arc tube and components.

5. A lamp according to claim 1 wherein said coating comprises a phosphate or arsenate glass of at least one of the metals aluminium, iron, chromium, titanium, vanadium and tin.

6. A lamp according to claim 1 wherein said coating is composed of an aluminium phosphate glass.

7. A lamp according to claim 5 wherein the atomic ratio of metal to phosphorus or arsenic in the glass composition is from 1:0.1 to 1:2.9.

8. A lamp according to claim 1 wherein said coating is the deposited and baked residue of a solvent-soluble complex phosphate or arsenate.

9. A lamp according to claim 1 wherein said coating comprises the deposited and baked residue of a compound of said metal and an acid moiety selected from oxyacids of phosphorous or arsenic.

* * * * *